US009011622B2

(12) United States Patent
Radtke

(10) Patent No.: US 9,011,622 B2
(45) Date of Patent: Apr. 21, 2015

(54) HIGH-PRESSURE TANK WITH PERMEATION BARRIER

(75) Inventor: Wulf Radtke, Planegg (DE)

(73) Assignee: MT Aerospace AG, Augsburg (DE)

(*) Notice: Subject to any disclaimer, the term of this patent is extended or adjusted under 35 U.S.C. 154(b) by 0 days.

(21) Appl. No.: 13/701,577

(22) PCT Filed: Mar. 30, 2011

(86) PCT No.: PCT/EP2011/001607
§ 371 (c)(1),
(2), (4) Date: Mar. 12, 2013

(87) PCT Pub. No.: WO2011/150993
PCT Pub. Date: Dec. 8, 2011

(65) Prior Publication Data
US 2013/0256157 A1    Oct. 3, 2013

(30) Foreign Application Priority Data
Jun. 1, 2010  (DE) .......... 10 2010 022 342

(51) Int. Cl.
B29D 22/00     (2006.01)
F17C 1/06      (2006.01)
F17C 1/16      (2006.01)
F17C 1/00      (2006.01)

(52) U.S. Cl.
CPC .......... B29D 22/003 (2013.01); *F17C 1/06* (2013.01); *F17C 1/16* (2013.01); *F17C 2201/0104* (2013.01); *F17C 2201/0128* (2013.01); *F17C 2201/0147* (2013.01); *F17C 2201/054* (2013.01); *F17C 2203/0604* (2013.01); *F17C 2203/0619* (2013.01); *F17C 2203/0636* (2013.01); *F17C 2203/0646* (2013.01); *F17C 2203/0648* (2013.01); *F17C 2203/0651* (2013.01); *F17C 2203/0663* (2013.01); *F17C 2209/2163* (2013.01); *F17C 2209/221* (2013.01); *F17C 2209/227* (2013.01); *F17C 2209/232* (2013.01); *F17C 2221/011* (2013.01); *F17C 2221/012* (2013.01); *F17C 2221/016* (2013.01); *F17C 2221/017* (2013.01); *F17C 2221/031* (2013.01); *F17C 2223/0123* (2013.01); *F17C 2223/0161* (2013.01); *F17C 2223/035* (2013.01); *F17C 2260/012* (2013.01); *F17C 2270/0189* (2013.01); *F17C 2270/0194* (2013.01); *Y02E 60/321* (2013.01); *F17C 1/005* (2013.01)

(58) Field of Classification Search
CPC ............ F17C 1/16; F17C 1/12; F17C 1/06; F17C 1/04; F17C 1/02; F17C 1/005; F17C 2203/0636; F17C 2203/0663; F17C 2203/0665; F17C 2203/0648; F17C 2209/232; F17C 2209/22; F17C 2209/2163; F17C 2209/2154; F17C 2209/21; F17C 2203/0668; F17C 2203/067; F17C 2203/0673; F17C 2203/066; F17C 2203/0658
USPC ........... 220/590, 589, 588, 586; 206/0.6; 242/470, 430; 156/173
See application file for complete search history.

(56) References Cited

U.S. PATENT DOCUMENTS

| 2,744,043 A | * | 5/1956 | Ramberg ............... 156/155 |
| 3,240,644 A | * | 3/1966 | Wolff ................... 156/165 |
| 3,321,347 A | * | 5/1967 | Price et al. ............. 156/151 |
| 3,815,773 A | * | 6/1974 | Duvall et al. ........... 220/590 |
| 4,225,051 A | * | 9/1980 | Faudou et al. .......... 220/590 |
| 4,366,917 A | * | 1/1983 | Kotcharian .......... 220/560.06 |
| 5,323,953 A | * | 6/1994 | Adderley et al. ........ 228/157 |
| 5,798,156 A |   | 8/1998 | Mitlitsky et al. |

FOREIGN PATENT DOCUMENTS

DE    28 15 772 A1    10/1978
WO    00/57102 A1    9/2000

OTHER PUBLICATIONS

Metal Suppliers Online. "Titanium 15-3-3-3". Wayback Machine. http://www.suppliersonline.com/propertypages/15-3-3-3.asp. Oct. 24, 2007. pp. 1-2.*

* cited by examiner

*Primary Examiner* — Robert J Hicks
(74) *Attorney, Agent, or Firm* — Rothwell, Figg, Ernst & Manbeck, P.C.

(57) ABSTRACT

The present invention relates to a high-pressure tank made from fiber-reinforced plastic for, in particular, gaseous media, wherein, on its inner wall, the tank is equipped completely or partially with a substantially permeation-tight foil made of metal, wherein the metal has a high elastic range and a low thermal expansion coefficient, and the foil has a thickness of ≤0.5 mm. The invention also relates to a method for manufacturing tanks of this type.

12 Claims, No Drawings

HIGH-PRESSURE TANK WITH PERMEATION BARRIER

CROSS REFERENCE TO RELATED APPLICATION

This application is a 35 U.S.C. 371 National Phase Entry Application from PCT/EP2011/01607, filed Mar. 30, 2011, which claims the benefit of German Patent Application No. 10 2010 022 342.5 filed on Jun. 1, 2010, the disclosure of which is incorporated herein in its entirety by reference.

The present invention relates to high-pressure tanks for receiving and holding media such as helium (He), neon (Ne), argon (Ar), krypton (Kr), xenon (Xe) as well as air, oxygen ($O_2$) and possibly also hydrogen ($H_2$). In addition to gaseous media, the tanks should also be able to receive and hold liquids or media that may be dropped. The high-pressure tanks are composed of fiber-reinforced plastic (fiber composite) and feature a permeation barrier. The invention also relates to a process for manufacturing such high-pressure tanks equipped with a permeation barrier.

High-pressure tanks today are nearly predominantly built of fiber-reinforced plastic. Fiber-reinforced plastics are able to incorporate significant characteristics best suited for high-pressure tanks such as light weight as well as mechanical and thermal stability or strength.

However, tanks made of fiber-reinforced plastics are not per se necessarily permeation-tight if they are not to be negatively influenced as to their thickness and thus their weight.

It is already known to equip tanks made of fiber-reinforced plastics with a permeation barrier. As a general rule, plastic liners are used, for example thermoplastic liner materials. However, plastic liners tend to be susceptible to local leaks caused by elongation at defect spots and joints. Their leak rate should be approximately three orders of magnitude lesser than that of metal liners, for example. They are therefore not suited for long-term missions with helium, for example in space travel.

U.S. Pat. No. 5,798,156 describes a light-weight compressed gas tank with an inside liner made of polymeric material. The liner is made of a thin polymeric layer which itself may or may not be coated with a thin layer of material with low permeability, such as silver, gold or aluminum. The polymeric liner is described in context with pressure tanks for compressed gases made from graphite epoxy composite. The density $\rho$ ($\rho=m/V$) in case of uncoated polymeric liners is e.g. 0.925 g/cm$^3$ and 1.965 g/cm$^3$, for LDPE (low density polyethylene) with a gold coating as opposed thereto it is 19.29 g/cm$^3$.

Metal liners are also used as permeation barriers. However, those metal liners, which might hitherto be used as permeation barriers, are so thick that weight might pose a problem. This applies particularly if the high-pressure tank is supposed to be used in aerospace application.

Metal liners are, for example, known from DE 28 15 772 A1, which, among other things, suggests the use of nickel-titanium alloys with a titanium content of 44 to 47%. The liner's wall thickness is stated as being 0.5 mm.

U.S. Pat. No. 3,312,575 suggests ductile nickel as liner material with a wall thickness of 0.76 mm.

The intent of the present invention is to show alternatives to this state of the art which are technically and/or commercially advantageous and allow a wide range of potential applications for the high-pressure tanks.

In other words, the intent is to make available high-pressure tanks with a high degree of thermal and mechanical resilience, light weight and a reliably high degree of permeation resistance also in the presence of cryogenic temperatures and up to +100° C.

It has been determined that the afore stated disadvantages may be omitted by choosing a mode of construction and/or material which takes the following criteria in consideration:

1. material with a very high elastic range ($\epsilon=R_{p0,2}/E$) according to Hooke's law, with $R_{p0,2}$ being the yield point and E the elastic modulus;
2. material with an as small as possible thermal expansion coefficient $\alpha$;
3. foil thickness;
4. joining by material engagement for example with overlap, electronic welding and pressure welding connection, with closing the liner being the major part of development.

Joining by material engagement may also be accomplished by way of bonding or other known methods.

In any case the objective is to reduce the liner's mass as far as possible. This may be achieved by selecting the right material for the liner and by minimizing liner thickness.

As a consequence, the present invention suggests using metal foils.

The present invention thus in its first aspect relates to a high-pressure tank made of fiber-reinforced plastic for particularly gaseous media, wherein the tank at its inner wall is equipped with a substantially permeation-tight metal foil having a great elastic range, a low thermal expansion coefficient and a thickness of ≤0.5 mm.

Preferred embodiments are given in the subclaims.

Thus, the thickness of the permeation-tight metal foil is preferably in the µm-range. This may result in a distinct and advantageous reduction in weight while at the same time providing for reliable permeation-tightness for gases.

The selected metal foil is preferably also impermeable for small-atom and small-molecular gases such as helium (He) and nitrogen ($N_2$), so that the tank may be used for storage and transport of these gases as is required in aerospace applications.

The metal foil for the particular fields of application should preferably be based upon a metal alloy resistant to compressed hydrogen, which assures that the liner quality also under these conditions will not change over time, in particular as relates to non-permeability.

Particularly preferred metal foils are based upon titanium alloys, preferably Ti-15-3-3-3. With these alloys a suitable rolling can be carried out at room temperature.

As pertains to the above aspects 1 and 2, the following must be noted:

Aluminum foils are considered as liners or permeation barriers. Even though they have a rather unfavorable thermal expansion coefficient, they are indeed suitable for application fields in which this circumstance is not significant. As a general rule, they have a sufficiently wide elastic range $\epsilon$ (see attached table).

However, it appeared that high-strength titanium alloys are best suited in this respect as long as the use of hydrogen or cryogenic temperatures are not foreseen as operation conditions. High-strength special nickel alloys owing to their at the same time slight elastic modulus meet the requirements for a high elastic range.

Metal foils with a low thermal expansion coefficient $\alpha$ are to be expected among titanium and its alloys, iron alloys with cubic body centered grid structure, some nickel basis alloys as well as alloys with specifically admeasured nickel content (Invar and Kovar alloys). In particular for the latter, a minimum in thermal expansion is necessarily associated with a decrease in yield strength.

However, it appeared that by changing the alloy composition by adding other alloy elements materials with very high yield strength $R_{p0,2}$, reduced elastic modulus E, a high elastic range $\epsilon$ and outstanding hydrogen and temperature stability are provided. These "high strength (super) alloys" are found in Anglo-Saxon literature under the designation "thermospan, low expansion, controlled (thermal) expansion, low coefficient of (thermal) expansion alloys".

Chromium-nickel-steels meet these requirements only to a limited extent.

The alloy Ti-15-3-3-3 is available as a foil tape having a width of 381 mm and a thickness of 1/100 mm. With smaller widths, foil thickness goes in the μm-range.

As already stated above, foils made of aluminum and its alloys are suitable for applications in which the rather poor thermal expansion coefficient is of minor significance. The advantage here is that, up to a minimum wall thickness, depending upon tank size and tank geometry, it is possible to manufacture seamlessly (integrally) formed liners and then to reduce their wall thickness for example by chemical milling and/or metal-cutting processing.

The chosen foil thickness depends on one side on availability and on the other side on its processing abilities (shaping, pressure welding, handling in preparatory work for wrapping or winding, like applying of the wrapping or support, etc., or in the wrapping or winding process itself, respectively).

If hydrogen or cryogenic temperatures do play a role, this must be considered separately in selecting the liner material.

In the attached table a selection of liner materials suitable as permeation barrier is given exemplary and without any restrictions, that may be used according to the invention. These materials are claimed explicitly as liner material in conjunction with the high-pressure tanks embodied according to the invention.

The described embodiments result in a number of advantages as compared to the plastic liner technology, in particular as relates to mass and gas tightness. Well-directed selection of the liner material also compatibility with extreme temperatures and media may be achieved.

The present invention under a further aspect relates to a process to manufacture the afore stated high-pressure tanks, wherein the metal foil is mounted on a near-net-shaped core and joined by suitable methods, the surface of the metal foil is adhesively bonded to a suitable fiber-composite material and the core is removed after hardening.

Preferred embodiments of the process according to claim 7 are given in its subclaims and are further detailed below.

A particular preference is given to a soluble core, particularly preferably a water-soluble core. The latter may easily be dissolved from the tank regardless of its shape.

Manufacturing the metal foils as well as suitable joining methods are established state-of-the-art technologies. They have to be merely adapted to the respective case and field of application.

Alternative methods for manufacturing thin liner layers, particularly their formation from liquids, gases or plasma at the inner side of the prefabricated fiber composite hull, from conditions of manufacture suffer from insufficient tightness against high-pressure gases and/or high-pressure liquids consisting of very small and thus extremely permeative atoms or molecules such as helium (He) and hydrogen ($H_2$). In addition, there are difficulties with localizing leaks related to conditions of manufacture and there is no easy repair method available.

However, starting with foils, these prior to or during their use in liner manufacture may be inspected for tightness. Owing to typical and actually unavoidable faults in foil manufacture such as entrapment/emergence of non-metal inclusions during metallurgic smelting processes, imprints caused by impurities during the rolling process, etc., which cause leaks in thin foils, a critical minimum foil thickness must be observed. In pure terms of rolling technology, foils could actually be much thinner, but they would then not have sufficient tightness.

The liner in a preferred embodiment is manufactured of individual parts and then joined leak-tight on the near-net-shaped core.

Manufacture of the individual parts as well as joining to liner is based upon familiar production engineering. Shaping individual parts is accomplished with familiar sheet-metal forming techniques.

As pertains to joining techniques, methods for bonding by material engagement for the purpose of tightness, because of geometric compatibility and minimization of bending stress are to prefer. The choice of butt joining or overlap joining technology depends upon the material chosen, the joining technology and geometric considerations.

For stability reasons, preferred methods are welding and brazing. In the welding domain, fusion welding and pressure welding has to be differentiated. Fusion welding can be done with laser, electron beam, microplasma as well as combinations thereof. For pressure welding rolling seam, foil seam, mash seam, glue welding, ultra sonic, diffusion, cold pressure welding, magnetic pressure welding, friction stir welding as well as combinations thereof can be considered.

Building the liner is preferably accomplished on an interior core, because this on one side absorbs the energy required for joining the liner and then on the other side absorbs the energy for wrapping a fiber composite.

In particular with high-pressure tanks, such an interior core after wrapping and hardening the fiber composite and also owing to the tank design can frequently not be removed from the tank. The core material is therefore in this application preferably such that it upon completion of the tank-shaping process may be removed from the tank with the help of a solvent, e.g. water. A suitable material might for example be Aquacore® or Aquapour®. This is a high-temperature-resistant, powdery core material. It may be used for manufacturing complex shaping cores, e.g. by casting or injecting.

In case this core material is not suitable in conjunction with the chosen liner joining process (due to surface pressure or chemical incompatibility), local inserts of better-suited material may be provided on the core. For example, strips of appropriate metallic materials may be provided directly under the liner closing welding seam, which during the core dissolving process may be pulled out through small tank apertures.

Finally it is noted, that the embodiment and manufacture of high-pressure tanks according to the invention is applicable to all tank shapes such as cylindrical, ball-shaped or cone-shaped sizes. Any other shapes, e.g. with several curvatures, are also possible. The liner itself is not a bearing element, and permeation tightness against gases is therefore sufficient.

TABLE

| Material | Tough against compressed hydrogen gas | Tough at subzero temps | ρ kg/dm³ | α $10^{-6}K^{-1}$ | $R_{p0,2}$ MPa | E GPa | ε = $R_{p0,2}/E$ % |
|---|---|---|---|---|---|---|---|
| Aluminum | | | | | | | |
| 7020 T6 | + | 0/+ | 2.77 | 23.1 | 280 | 70 | 0.40 |
| 7075 T6 | + | 0/+ | 2.80 | 23.4 | 460 | 70 | 0.65 |
| CrNi-steels | | | | | | | |
| 1.3974 (full austenitic CrNi-steel) | + | + | 7.86 | 15.5 | 510 | 198 | 0.25 |
| Thermosetting CrNi-steel (A286) | 0/+ | + | 7.94 | 17 | 654 | 200.5 | 0.32 |
| CuBe | + | + | 8.25 | 17 | 1130 | 125 | 0.90 |
| Ni-alloys | | | | | | | |
| Ni-Span C-902 | + | + | 8.05 | 7.74 | 868 | 173 | 0.50 |
| Inconel 903 | + | + | 8.25 | 7.2 | 1103 | 146.8 | 0.75 |
| Inconel 718 | 0/− | + | 8.20 | 13.14 | 523-1309 | 199.8 | 0.26-0.65 |
| Titanium alloys | | | | | | | |
| Unalloyed Ti | + | 0/+ | 4.51 | 8.6 | 172-482 | 103 | 0.16-0.46 |
| Ti-5-2,5 (α) | 0/+ | + | 4.48 | 9.4 | 720 | 110 | 0.65 |
| Ti-3-2,5 (α + β) | + | 0/+ | 4.49 | 9.9 | 516 | 103 | 0.50 |
| Ti-6-4 (α + β) | + | 0/+ | 4.43 | 8.8 | 827 | 113.6 | 0.72 |
| Ti-15-3-3-3 (β) | − | 0/− | 4.76 | 8.5 | 689-965 | 82-107 | 0.84-0.90 |
| Beta 21 S (β) | − | 0/− | 4.94 | 7.06 | 758-1277 | 79-105 | 0.95-1.2 |

The stated parameters apply at room temperature

ρ = density; α = thermal expansion coefficient; $R_{p0,2}$ = yield strength; E = elastic modulus; ε = elastic range

The invention claimed is:

1. A process for manufacturing a high-pressure tank made of fiber-reinforced plastic for receiving gaseous media comprising:
    mounting a substantially permeation-tight metal foil comprising a first end area and a second end area on a net shaped core by joining the first and second end areas of the metal foil on the core to match the shape of the net shaped core;
    contacting the surface of the foil not in contact with the net shaped core with a fiber composite material;
    hardening the fiber composite material to adhesively bond the surface of the metal foil to the fiber composite material, wherein the metal foil forms an inner surface of the high-pressure tank and the fiber composite material forms an outer surface of the high-pressure tank; and
    thereafter removing the core after hardening of the fiber composite material,
    wherein the metal foil has a high elastic range and a low thermal expansion coefficient,
    wherein the metal is selected from the group consisting of 7020 T6, 7075 T6, 1.3974 (full austenitic CrNi-steel), Thermosetting CrNi-steel (A286), CuBe, Ni-Span C-902, Inconel 903, Inconel 718, Unalloyed Ti, Ti-5-2,5 (α), Ti-3-2,5 (α+β), Ti-6-4 (α+β), Ti-15-3-3-3 (β), and Beta 21 S (β),
    wherein the foil has a thickness of ≤0.5 mm, and
    wherein the foil is contactable by an internal content of the tank.

2. The process according to claim 1, wherein the core is a soluble core.

3. The process according to claim 2, wherein the core is a water-soluble core.

4. The process according to claim 1, wherein the metal foil is joined with edge overlap.

5. The process according to claim 1, wherein the joining step is performed by welding or brazing.

6. The process to manufacture a high-pressure tank according to claim 1, wherein the metal foil is 1.3974 (full austenitic CrNi-steel).

7. The process to manufacture a high-pressure tank according to claim 1, wherein the metal foil is Inconel 903.

8. The process to manufacture a high-pressure tank according to claim 1, wherein the metal foil is Inconel 718.

9. The process to manufacture a high-pressure tank according to claim 1, wherein the metal foil is Unalloyed Ti.

10. The process to manufacture a high-pressure tank according to claim 1, wherein the metal foil is Ti-15-3-3-3 (β).

11. The process to manufacture a high-pressure tank according to claim 1, wherein the metal foil is Beta 21 S (β).

12. The process to manufacture a high-pressure tank according to claim 1, wherein the foil has a thickness >1 μm and ≤10 μm.

* * * * *